United States Patent
Fouquet et al.

(10) Patent No.: US 11,611,662 B2
(45) Date of Patent: Mar. 21, 2023

(54) METHOD FOR PROCESSING MESSAGES BY A DEVICE OF A VOICE OVER IP NETWORK

(71) Applicant: ORANGE, Issy-les-Moulineaux (FR)

(72) Inventors: Stéphane Fouquet, Chatillon (FR); Juan Pascual, Chatillon (FR)

(73) Assignee: ORANGE, Issy-les-Moulineaux (FR)

( * ) Notice: Subject to any disclaimer, the term of this patent is extended or adjusted under 35 U.S.C. 154(b) by 0 days.

(21) Appl. No.: 17/251,484

(22) PCT Filed: May 28, 2019

(86) PCT No.: PCT/FR2019/051253
§ 371 (c)(1),
(2) Date: Dec. 11, 2020

(87) PCT Pub. No.: WO2019/239029
PCT Pub. Date: Dec. 19, 2019

(65) Prior Publication Data
US 2021/0258428 A1   Aug. 19, 2021

(30) Foreign Application Priority Data

Jun. 13, 2018   (FR) ...................................... 1855184

(51) Int. Cl.
*H04L 12/66* (2006.01)
*H04M 3/00* (2006.01)
(Continued)

(52) U.S. Cl.
CPC ...... *H04M 7/0075* (2013.01); *H04L 65/1069* (2013.01); *H04L 65/1104* (2022.05); *H04M 7/0078* (2013.01)

(58) Field of Classification Search
CPC ........... H04L 65/1069; H04L 29/06027; H04L 63/08; H04L 63/083; H04L 63/0428;
(Continued)

(56) References Cited

U.S. PATENT DOCUMENTS 6,856,616 B1    2/2005  Schuster et al.
10,149,156 B1 *  12/2018  Tiku ...................... H04W 12/66
(Continued)

OTHER PUBLICATIONS

International Search Report dated Jul. 31, 2019 for corresponding International Application No. PCT/FR2019/051253, filed May 28, 2019.
(Continued)

*Primary Examiner* — Kharye Pope
(74) *Attorney, Agent, or Firm* — David D. Brush; Westman, Champlin & Koehler, P.A.

(57) ABSTRACT

A method for processing messages by a device of a Voice over IP (VoIP) network. The method includes, following receipt of a message initiating a VoIP call coming from a terminal: determining whether the message contains a public telephone identity allocated to a user by the VoIP network; if so, triggering setting-up the VoIP call with a recipient of the message; otherwise: setting up a VoIP channel between the terminal and a voice server hosted by the device; obtaining, by the server via this channel, an authentication code of a user of the terminal; if the authentication code is associated at VoIP network level with a public telephone identity allocated by the network to a user, providing to the terminal the public telephone identity and authentication data associated at VoIP network level with this identity for making VoIP calls and being authenticated to the VoIP network.

12 Claims, 2 Drawing Sheets

(51) Int. Cl.
*H04M 5/00* (2006.01)
*H04M 7/00* (2006.01)
*H04L 65/1069* (2022.01)
*H04L 65/1104* (2022.01)

(58) Field of Classification Search
CPC . H04L 67/02; H04L 63/0876; H04L 63/0823; H04L 67/104; H04L 9/30; H04L 65/1006; H04L 65/1076; H04M 15/56; H04M 7/006; H04M 2215/202; H04M 3/42042; H04M 7/0063; H04M 3/42059; H04M 7/0078; H04M 3/382; H04M 2203/6045
USPC ....... 370/352, 401, 329, 338, 230, 353, 356, 370/389
See application file for complete search history.

(56) References Cited

U.S. PATENT DOCUMENTS

| | | | | |
|---|---|---|---|---|
| 10,581,829 | B1* | 3/2020 | Don | H04L 63/0823 |
| 2005/0180403 | A1 | 8/2005 | Haddad et al. | |
| 2006/0294242 | A1* | 12/2006 | Ozaki | H04L 65/1104 |
| | | | | 709/227 |
| 2008/0046735 | A1 | 2/2008 | Nedeltchev et al. | |
| 2008/0084870 | A1* | 4/2008 | Taylor | H04W 4/02 |
| | | | | 370/352 |
| 2008/0235511 | A1* | 9/2008 | O'Brien | H04L 9/0844 |
| | | | | 713/171 |
| 2009/0300197 | A1* | 12/2009 | Tanizawa | H04L 63/083 |
| | | | | 709/229 |
| 2010/0246780 | A1* | 9/2010 | Bakker | H04L 65/1095 |
| | | | | 379/38 |
| 2011/0022844 | A1* | 1/2011 | Petillo | H04L 9/3226 |
| | | | | 713/170 |
| 2012/0245941 | A1* | 9/2012 | Cheyer | G10L 17/24 |
| | | | | 704/E15.004 |
| 2013/0170361 | A1* | 7/2013 | Manyakin, Jr. | H04L 65/103 |
| | | | | 370/241 |
| 2013/0336308 | A1* | 12/2013 | Laasik | H04M 7/0057 |
| | | | | 370/352 |
| 2014/0040469 | A1* | 2/2014 | Cho | H04L 65/1094 |
| | | | | 709/225 |
| 2015/0030156 | A1* | 1/2015 | Perez | H04L 63/0428 |
| | | | | 380/270 |
| 2016/0021255 | A1* | 1/2016 | Weldon | H04M 7/003 |
| | | | | 455/411 |
| 2016/0112562 | A1* | 4/2016 | Krack | H04M 3/4365 |
| | | | | 379/189 |
| 2018/0278746 | A1* | 9/2018 | Yacov | H04M 3/42042 |
| 2018/0288036 | A1* | 10/2018 | Bender | G06F 21/33 |

OTHER PUBLICATIONS

Written Opinion of the International Searching Authority dated Jul. 31, 2019 for corresponding International Application No. PCT/FR2019/051253, filed May 28, 2019.
French Search Report dated Dec. 20, 2018 for corresponding French Application No. 1855184, filed Jun. 13, 2018.
English translation of the Written Opinion of the International Searching Authority dated Aug. 9, 2019 for corresponding International Application No. PCT/FR2019/051253, filed May 28, 2019.

* cited by examiner

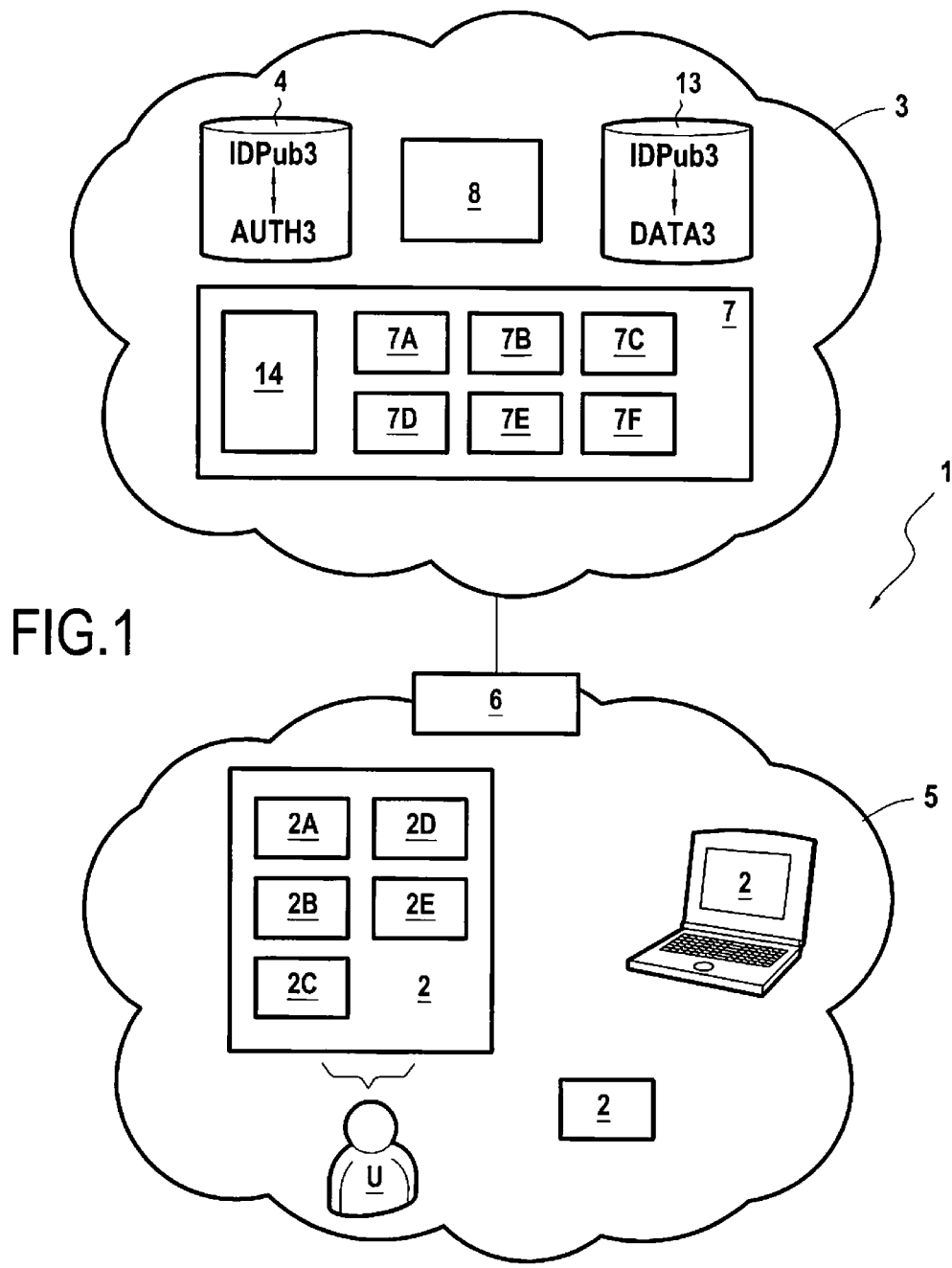
FIG.1
FIG.2
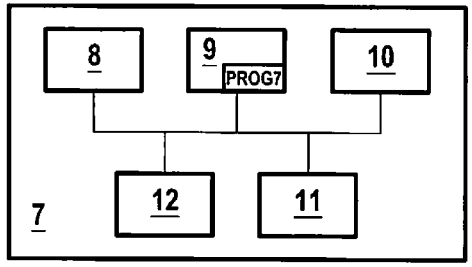
FIG.3
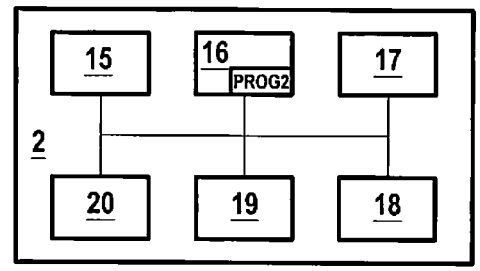

METHOD FOR PROCESSING MESSAGES BY A DEVICE OF A VOICE OVER IP NETWORK

CROSS-REFERENCE TO RELATED APPLICATIONS

This application is a Section 371 National Stage Application of International Application No. PCT/FR2019/051253, filed May 28, 2019, the content of which is incorporated herein by reference in its entirety, and published as WO 2019/239029 on Dec. 19, 2019, not in English.

BACKGROUND OF THE INVENTION

The invention relates to the general field of telecommunications.

It more specifically concerns a method allowing the pairing, at the level of a telephone network, of a terminal with a public telephone identity allocated to a user by the telephone network for the purpose of allowing the terminal to use this public telephone identity to communicate over the telephone network while preserving the security of the Voice over IP network.

The invention thus has a preferred but non-limiting application in the context of fixed telephony, and in particular fixed telephony based on Voice over IP (or VoIP) technology.

In the current state of the art, in fixed telephony (by contrast with mobile telephony), the telephone operator allocates to each user a public telephone identity intended to be used over the telephone network, then this public telephone identity is associated (i.e. paired) with a dedicated terminal of the user (for example with a particular telephone). This allows the telephone operator, when a terminal issues a call over its network using a public telephone identity, to check that this terminal is indeed associated with this telephone identity and is indeed authorized to use it. As long as a terminal is not paired in the information system of the telephone operator with a public telephone identity allocated by the operator to a user, the terminal is not capable of making any call whatsoever over the telephone network of the operator by using this identity. For the user of the terminal, this situation can prove somewhat unsettling: no tone is issued in his phone when he picks it up to issue a call, at the most he is prompted to register his terminal before any prior use over the telephone network.

To pair a terminal with a public telephone identity, the telephone network relies on an identifier of the terminal used to identify it unequivocally. This identifier is for example in the prior art a hardware identifier of the terminal, such as a MAC (Medium Access Control) address used to identify it in a unique manner. At present, access to this hardware identifier by the telephone network operator generally requires the involvement of an administrator and can prove lengthy and tiresome to implement. The effort to be provided is all the more considerable in the current context of VoIP telephony, in which one and the same user can have cause to use several separate terminals sharing one and the same public telephone identity allocated to this user. In this context, the administrator must be involved each time one wishes to attribute the telephone identity of a user to another terminal.

Consequently, there is a need for a method allowing an operator of a Voice over IP telephone network to easily make sure of the pairing of a terminal with a public telephone identity allocated over its network without however sacrificing security of access to its network.

SUBJECT AND SUMMARY OF THE INVENTION

The invention responds to this need by proposing a method for processing messages by a device of a Voice over IP network, comprising, following receipt of a message initiating a Voice over IP call coming from a terminal:
 a step of determining whether or not the received message contains a public telephone identity allocated to a user by the Voice over IP network;
 if the message contains a so-called public telephone identity, a step of triggering the setting-up of the Voice over IP call with a recipient of the received message following a positive authentication of the terminal;
 otherwise:
  a step of setting up a Voice over IP channel between the terminal and a voice server hosted by the device of the Voice over IP network;
  a step of obtaining, by the voice server via this channel, an authentication code of a user of the terminal;
  if the obtained authentication code is associated at Voice over IP network level with a public telephone identity allocated by the network to a user, a step of providing to the terminal the public telephone identity and authentication data associated at Voice over IP network level with this public telephone identity for making Voice over IP calls and being authenticated to the Voice over IP network.

Correspondingly, the invention also relates to a device of a Voice over IP network hosting a voice server and comprising modules enabled when the device receives a message initiating a Voice over IP call coming from a terminal, these modules comprising:
 a determining module, configured to determine whether or not the received message contains a public telephone identity allocated to a user by the Voice over IP network;
 a triggering module, configured to trigger the setting-up of the Voice over IP call with a recipient of the received message if the determining module determines that the received message contains a so-called public telephone identity;
 modules, otherwise enabled, comprising:
  a setting-up module, configured to set up a Voice over IP channel between the terminal and the voice server;
  an obtaining module, configured to obtain via this channel an authentication code of a user of the terminal; and
  a providing module, enabled if the obtained authentication code is associated at Voice over IP network level with a public telephone identity allocated by the network to a user, and configured to provide to the terminal this public telephone identity and authentication data associated at Voice over IP network level with the public telephone identity to issue Voice over IP calls and be authenticated to the Voice over IP network.

The invention thus offers a simple and automated method for dynamically pairing user terminals of a Voice over IP telephone network with the telephone identities allocated to these users by the network. The term "pairing" should be understood to mean that a terminal is associated with a public telephone identity allocated by the Voice over IP network to a user, and that the latter can use it with the authorization of the Voice over IP network without compromising the security of the network. Note that in accordance with this invention, this pairing does not rely, unlike the state of the art, on the storage in a database of the Voice over IP network of an identifier uniquely characterizing the terminal (e.g. hardware identifier) in association with a public telephone identity allocated by the network, but it is carried out having the Voice over IP network provide the terminal with the public telephone identity that it has the right to use and with authentication data associated with this identity at network level. This providing is conditional on the authentication of the terminal user by way of a voice server.

In accordance with the invention, the use by the terminal of a public telephone identity allocated by the Voice over IP network is only possible after a positive authentication of the terminal user coupled with an authentication of the terminal by means of the items of information supplied by the Voice over IP network. The use by the terminal of the public telephone identity that the network has transmitted to it therefore proves that it is securely paired to a telephone identity attributed by the Voice over IP network, and that it is authorized to make calls over the Voice over IP network.

The pairing proposed by the invention is advantageously carried out by a device of the Voice over IP network via which the call initiation message sent by the terminal transits and which is configured, in accordance with the invention, to send to the terminal a public telephone identity that it can use to make Voice over IP calls solely when the terminal user provides an authentication code duly recognized by the Voice over IP network and corresponding to a public telephone identity allocated to a user by the network. Such a device can be a device dedicated to this purpose (such as an application server triggered on receipt of a call initiation message over the Voice over IP network coming from a terminal) or a proxy server hosted by an border equipment such as for example an SBC (Session Border Controller). This proxy server is for example in the context of a Voice over IP network using the SIP protocol, a SIP proxy or a back-to-back user agent or B2BUA.

In accordance with the invention, it is therefore the Voice over IP network which itself provides to the terminal the public telephone identity that the terminal must use to communicate over the Voice over IP network as well as the authentication data allowing it to be authenticated over the Voice over IP network. This procedure, which is carried out in the framework of the first call made by the terminal via the Voice over IP network, makes it possible to secure the pairing of the terminal with a public telephone identity of the Voice over IP network. Of course, preferably, the public telephone identity and the authentication data are supplied by the device of the Voice over IP network in a secure manner to the terminal (for example via a secure line, encrypted, etc.).

The solution proposed by the invention is therefore based on a pairing of the terminals with public telephone identities orchestrated by the Voice over IP network itself, after having made various checks to authenticate the terminal user and the terminal itself. The invention guarantees the security of the pairing by installing a double level of authentication: a first level of "vocal" authentication ensured by the supplying of the authentication code by the terminal user to the voice server, and a second level of "software" authentication provided by the providing by the terminal of authentication data that it has received with the public telephone identity of the Voice over IP network. This makes it possible to guarantee the security and integrity of the pairing, and to effectively guard against attempts of telephone identity theft over the Voice over IP network.

The invention has a preferred but non-limiting application when the operator of the Voice over IP telephone network is separate from the operator which provides to the terminal user the network access allowing the user to connect to the Voice over IP telephone network (typically the operator which provides to the terminal user the gateway or "box" allowing it to access external networks, such as the public Internet network).

The method proposed by the invention advantageously makes it possible to dispense with the involvement of an administrator to pair user terminals with telephone identities over the Voice over IP network, and therefore facilitates the pairing operation in the event of a change of terminal by a user. The invention is consequently particularly suitable in the context of IP telephony wherein the use of multiple terminals associated with one and the same public telephone identity is made possible and routine. It is also particularly advantageous in dynamic environments where terminals are often replaced or new terminals are liable to be added (e.g. extension of the stock of terminals of a company, etc.).

Moreover, the method proposed by the invention is very simple to implement and secure as mentioned previously. It relies on the telephone network side on the prior providing (and storing) of an authentication code to the user, associated at Voice over IP network level with an allocated public telephone identity for communicating over the Voice over IP network, an authentication code that the user is prompted to provide to a voice server the first time he accesses the telephone network with his terminal to allow, where applicable, the pairing of his terminal with its telephone identity. The invention therefore only requires a limited involvement of the terminal user to pair his terminal. Furthermore, it improves the experience of the user by comparison with the state of the art, since he is redirected to a voice server the first time he accesses the Voice over IP telephone network. In other words, unlike the state of the art, the user can initiate a call from his terminal even if it is not yet paired with the telephone identity allocated to the user (i.e. he does not encounter an absence of tone in his terminal when he wants to issue such a call), but this call is automatically redirected by the Voice over IP network, before setting up the call, to a voice server which prompts the user to provide an authentication code to carry out the pairing and provide to the terminal the public telephone identity that it will subsequently be able to use over the Voice over IP network.

The authentication code supplied by the user allows the Voice over IP network device according to the invention to make sure that the terminal that seeks to set up a call over the network does indeed belong to a user authorized to access the telephone network. Advantageously, this authentication code is only required from the user a single time for each of his terminals, i.e. solely the first time he attempts to use the Voice over IP network with one of his terminals in order to obtain the public telephone identity that he is entitled to use to communicate over the Voice over IP network. Once this public telephone identity is obtained, the terminal can use it to make calls over the Voice over IP network, in a conventional manner. In the same way the authentication of the terminal over the Voice over IP network by means of the authentication data that it has obtained from the network can be carried out in a standard way. The method according to the invention therefore advantageously does not require any major modification of the terminals.

Thus, the invention also targets a method of communication intended to be implemented by a terminal, the method comprising:

- a step of issuing a message initiating a Voice over IP call comprising a predetermined telephone identity with which the terminal has been previously configured;
- a step of setting up a Voice over IP channel with a voice server hosted by a Voice over IP network device;
- a step of providing via this channel to the voice server an authentication code of a user of the terminal;
- a step of receiving, from the device of the Voice over IP network, a public telephone identity associated at Voice over IP network level with said supplied authentication code and authentication data associated at Voice over IP network level with this public telephone identity; and
- a step of issuing at least one new message initiating a Voice over IP call comprising the public telephone identity and a step of authenticating to the Voice over IP network using the authentication data.

Correspondingly, the invention also relates to a Voice over IP terminal comprising:

- an issuing module, configured to issue a message initiating a Voice over IP call comprising a predetermined telephone identity with which the terminal has been previously configured;
- a setting-up module, configured to set up a Voice over IP channel with a voice server hosted by a device of a Voice over IP network;
- a providing module, configured to provide to the voice server, via the channel set up, an authentication code of a user of the terminal;
- a receiving module, able to receive from the device a public telephone identity associated at Voice over IP network level with the authentication code supplied by the providing module and authentication data associated with the public telephone identity at Voice over IP network level;

and wherein the issuing module is configured to issue at least one new message initiating a Voice over IP call comprising said public telephone identity, said terminal further comprising an authentication module, configured to be authenticated to the Voice over IP network using the authentication data.

The invention can therefore apply to many contexts, domestic or professional: the terminal within the meaning of the invention can be any device implementing a Voice over IP technology such as a hardware of software phone (or softphone), but also a private automatic branch exchange (or IPBX for IP Private Branch exchange) to which are attached a plurality of Voice over IP terminals and allowing, for example, a company to manage its phone calls, both internal and external, using the IP protocol. A user within the meaning of the invention can therefore be a private individual or a group of users such as a company to which the operators of the telephone network has allocated a telephone identity for communicating over its network.

In a particular embodiment of the processing method, the authentication of the terminal prior to the triggering step comprises a step of requesting the providing to the terminal of a proof of knowledge of authentication data associated at Voice over IP network level with the public telephone identity contained in the received message.

Such a proof of knowledge can be provided in a known manner by encrypting a message on either side by means of the authentication data and by sharing the encrypted messages to determine whether or not they match.

This embodiment makes it possible to avoid the direct transmission of the authentication data from the terminal to the Voice over IP network, and therefore to limit the risk of this item of authentication data being intercepted by a malicious third party.

In a particular embodiment, during the determining step of the processing method, the device determines that the received initiation message does not contain any public telephone identity allocated to a user by the Voice over IP network if it detects the presence in the received initiation message of a predetermined telephone identity communicated to the terminal during a prior phase of configuration of the terminal.

In other words, the terminal is in this embodiment configured to use, before receiving the public telephone identity allocated by the network, a standard telephone identity (for example 100), communicated to the terminal during a prior phase of configuration thereof. This embodiment facilitates the detection by the device of the Voice over IP network of the absence of pairing of the terminal: specifically, as soon as it detects in a call initiation message sent by a terminal the presence of this standard telephone identity, the device of the Voice over IP network can deduce therefrom that the terminal is not yet paired to a public identity, without polling the database of the Voice over IP network.

In a particular embodiment, the processing method further comprises, if the obtained authentication code is associated at Voice over IP network level with a public telephone identity allocated by the network to a user, a step of triggering the setting-up of a Voice over IP call with a recipient of the initiation message received from the terminal.

In this embodiment, the user of the terminal, once authenticated by the device of the Voice over IP network, does not need to re-send a new call initiation message. The setting-up of the Voice over IP call is triggered directly by the device of the Voice over IP network.

The step of triggering the setting-up of a Voice over IP call comprises a step of renegotiation with the terminal of a voice channel to set up the call.

In other words, in this embodiment, the voice channel set up between the terminal and the voice server is freed up, then a new voice channel is set up between the terminal and the device receiving the call initiation message to allow the setting-up of the call.

As mentioned on several occasions, the invention is applicable in the context of a Voice over IP telephone network.

In a preferred embodiment, this Voice over IP telephone network implements the SIP protocol (Session Initiation Protocol), and the call initiation message sent by the terminal is compliant with the SIP protocol (in particular it is a SIP INVITE message well-known per se). The SIP protocol is a protocol currently used in Voice over IP networks, which facilitates the implementation of the invention in different networks.

Of course, other protocols can be used in a variant, such as for example proprietary protocols.

In a particular embodiment, the voice server comprises a voice recognition module, and/or a voice synthesis module, and/or a conversational agent.

Such modules allow the voice server to easily retrieve the authentication code to carry out the pairing of the terminal. This embodiment improves the interactivity with the user and his experience during the pairing of his terminal.

In a particular embodiment, the different steps of the processing method and/or communication method are determined by instructions of computer programs.

Consequently, the invention also concerns a computer program on an information medium, this program being able to be implemented on a device of the Voice over IP network or more generally on a computer, this program including instructions suitable for implementing the steps of a processing method as described above. The invention also concerns a computer program on an information medium, this program being able to be implemented on a terminal or more generally on a computer, this program including instructions suitable for implementing the steps of a communication method as described above.

Each of these programs can use any programming language, and be in the form of source code, object code, or intermediate code between source code and object code, such as in a partially compiled form, or in any other desirable form.

The invention also concerns an information or recording medium readable by a computer and including instructions of a computer program as mentioned above.

The information or recording medium can be any entity or device capable of storing the program. For example, the medium can include a storage means, such as a ROM, for example a CD-ROM or a microelectronic circuit ROM, or else a magnetic recording means, for example a diskette (floppy disk) or a hard disk.

Moreover, the information or recording medium can be a transmissible medium such as an electrical or optical signal, which can be routed via an electrical or optical cable, by radio or by other means. The program according to the invention can in particular be downloaded over a network of Internet type.

Alternatively, the information or recording medium can be an integrated circuit wherein the program is incorporated, the circuit being suitable for executing or for being used in the execution of the method in question.

According to another aspect of the invention, the invention also concerns a communication system comprising:
 at least one Voice over IP terminal in accordance with the invention; and
 a device of a Voice over IP network in accordance with the invention able to process call initiation messages over the Voice over IP network coming from said at least one terminal.

It is also possible to envision, in other embodiments, that the processing method, the communication method, the device of the Voice over IP network able to implement the processing method, the terminal able to implement the communication method and the communication system according to the invention have in combination all or part of the aforementioned features.

BRIEF DESCRIPTION OF THE DRAWINGS

Other features and advantages of the present invention will become apparent from the description given below, with reference to the appended drawings which illustrate an exemplary embodiment thereof devoid of any limitation. In the figures:

FIG. 1 schematically represents a communication system in accordance with the invention in a particular embodiment;

FIG. 2 illustrates an example of hardware architecture of a device of the communication system of FIG. 1, in accordance with the invention; and FIG. 3 illustrates an example of hardware architecture of a terminal of the communication system of FIG. 1, in accordance with the invention.

DETAILED DESCRIPTION OF THE INVENTION

Figure 4:
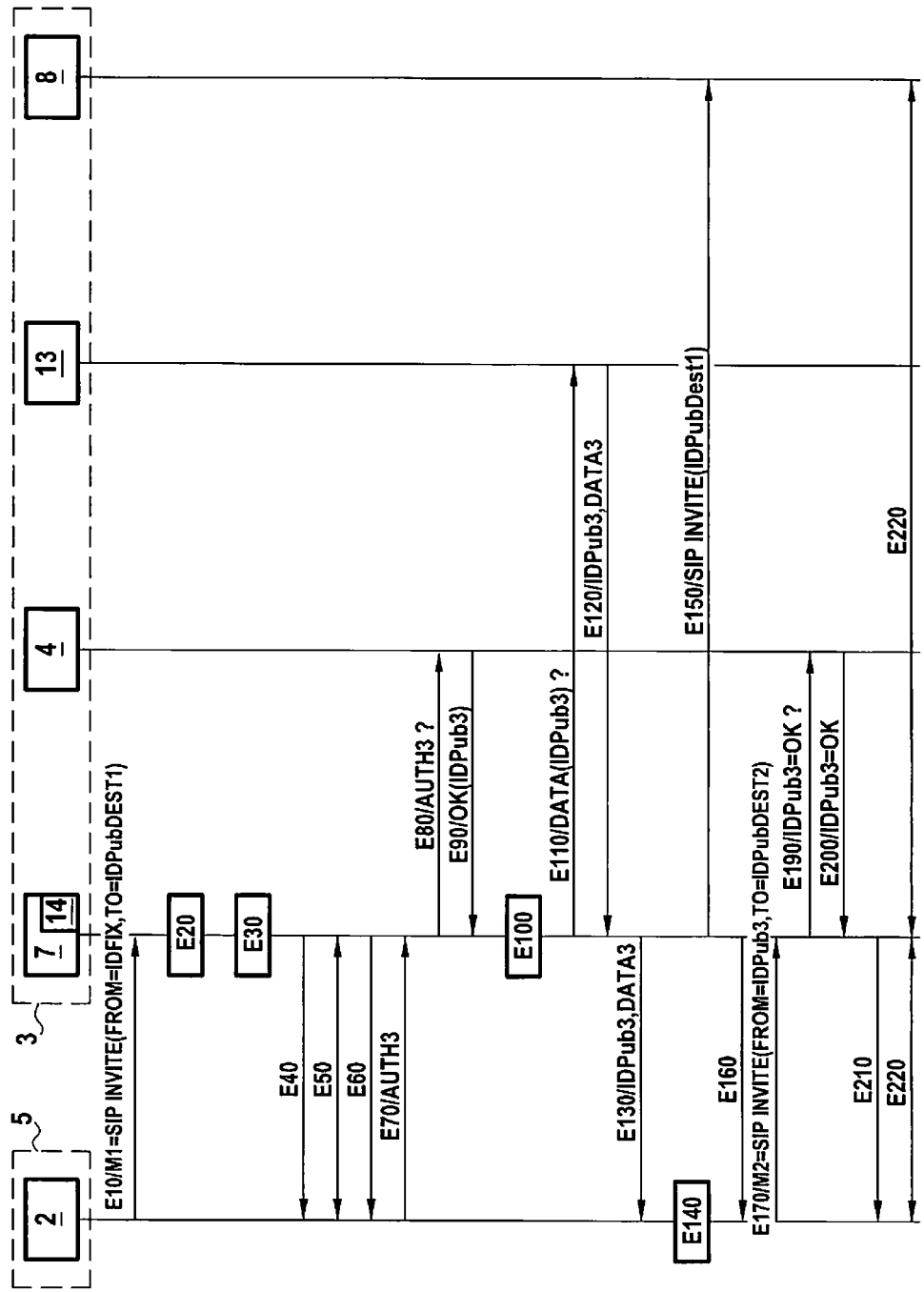
FIG. 4 shows, in the form of a flow diagram, the main steps of a processing method as implemented in a particular embodiment by the device of FIG. 2 as well as the main steps of a communication method as implemented in this particular embodiment by the terminal of FIG. 3.

FIG. 1 shows, in its environment, a communication system 1 in accordance with the invention, in a particular embodiment.

In the example illustrated in FIG. 1, the communication system 1 makes it possible to simplify the pairing of a terminal 2 of a user U, in accordance with the invention, with a telephone identity allocated to the user U by a Voice over IP telephone network 3 to which the user U has taken out a subscription. Here we are interested in a fixed telephone network implementing Voice over IP technology based on the SIP protocol (Session Initiation Protocol). This latter hypothesis is however not limiting in itself, and the invention can be applied to other protocols suitable for Voice over IP, such as for example to proprietary protocols.

When the user takes out his subscription to the operator of the network 3, a public telephone identity IDPub3 is allocated by the operator of the network 3 to the user U. This telephone identity identifies the user U on the Voice over IP network 3 and allows him to communicate via this network with other users. It is for example a telephone number, an address of SIP URI (Uniform Resource Identifier) type, an address of URL (Uniform Resource Locator) type, etc.

In accordance with the invention, the operator of the network 3 provides to the user U, for example when he takes out the aforementioned subscription, an authentication code AUTH3 associated in a database 4 of the network 3 with the public telephone identity IDPub3. No limitation is attached to the form that this authentication code takes, or how it is generated or exchanged between the network 3 and the user U (though preferably securely): it can for example be a string of alphanumeric characters or only numeric characters, a login/password pair agreed with the user U, etc. This code can be supplied by mail, by electronic message, by SMS (Short Message Service) or by any other means to the user U.

In the example envisioned in FIG. 1, we consider a residential context, wherein one or more users U possess one or more terminals 2, connected to a local network 5 managed by a residential gateway or box 6. For the sake of simplification, it is supposed here that each of the terminals 2 is a Voice over IP terminal capable of implementing a Voice over IP (VoIP) communication technique. However, this hypothesis is in no way limiting. Moreover, no limitation is attached to the nature of the terminals: they can be telephones, hardware or software, computers equipped with Voice over IP software, etc. It is supposed here that the terminals 2 are equipped with input/output means allowing them to interact with the user U such as for example a keyboard, a microphone and a loudspeaker etc.

The gateway 6 allows the terminals 2 to access networks external to the local network 5, such as for example the public Internet network or else the Voice over IP fixed telephone network. In other words, to issue a call over the network 3 or to receive a call via this network 3, the terminals 2 go through the gateway 6. The functionality of such a gateway is known per se and is not described in detail here.

The Voice over IP calls made by the terminals 2 of the local network 5 transit via a device 7 of the Voice over IP network 3, in accordance with the invention, before being transmitted to a platform 8 of the Voice over IP network 3 configured to set up these calls in the strict sense. Such a device 7 is for example an application server (AS), dedicated to the implementation of the invention and triggered on receipt of a call initiation message coming from the terminals 2, or it can be integrated into an existing item of equipment of the Voice over IP network 3 such as for example into an SBC (Session Border Controller), placed at the border of the Voice over IP network 3 and equipped with routing functionality such as that of a proxy server or a B2BUA user agent.

In the embodiment described here, the device 7 has the hardware architecture of a computer, as shown in FIG. 2. It particularly comprises a processor 8, a read-only memory 9, a random-access memory 10, a non-volatile memory 11, and communication means 12. These communication means 12 allow the device 7 to communicate with the terminals 2 of the local network 5, but also with other items of equipment belonging to the Voice over IP telephone network 3. They particularly include here a network card and a VoIP protocol stack suitable for implementing a Voice over IP communication technique according to the SIP protocol.

The read-only memory 9 of the device 7 constitutes a recording medium in accordance with the invention, readable by the processor and on which is recorded a computer program PROG7 in accordance with the invention, including instructions for executing a method for processing call initiation messages according to the invention. This method is intended, in accordance with the invention, to allow the secure pairing of a terminal of the local network with a public telephone identity of the Voice over IP network 3 to allow it to issue and receive Voice over IP calls via this network.

It is supposed here that when the operator of the network 3 allocates a public telephone identity to a user, it enters this telephone identity into the database 13. Consequently, when the user U has taken out his subscription to the operator of the network 3, the latter has added to the database 13 the telephone identity IDPub3 that it has allocated to the user U. It moreover associates with this public telephone identity IDPub3 authentication data DATA3. No limitation is attached to the form of this item of authentication data allocated by the Voice over IP network to the public telephone identity IDPub3: it can take the form of a password generated by the Voice over IP network 3 (for example at random), a certificate, an encryption key, etc. This item of authentication data DATA3 is stored in the database 13 in association with the public telephone identity IDPub3.

The computer program PROG7 defines various functional and software modules of the device 7, able to implement the steps of the processing method according to the invention and relying on the previously-described hardware elements 8-12 of the device 7. Here, these modules particularly comprise:

- a receiving module 7A, able to receive a message initiating a Voice over IP call coming from a terminal 2 of a user U connected to the local network 5. Such a message is, in the example envisioned here of a Voice over IP telephone network implementing the SIP protocol, a SIP INVITE message;
- a determining module 7B, configured to determine whether or not the SIP INVITE message received by the module 7A contains a telephone identity allocated by the Voice over IP network 3 to a user;
- a triggering module 7C configured to trigger the setting-up of the Voice over IP call required by the terminal 2 if the message comprises such a public telephone identity, after having positively authenticated the terminal 2. In the embodiment described here, the module 7C is configured to transfer this call to the platform 8 in charge of setting up the calls in the strict sense on the Voice over IP network 3;
- modules, enabled if the received message does not contain a telephone identity allocated by the Voice over IP network 3 to a user, and comprising:
  - a setting-up module 7D, configured to set up a Voice over IP channel between the terminal 2 and an interactive voice server 14 hosted by the device 7. In the embodiment described here, the interactive voice server 14 comprises a voice recognition module (not shown) known per se, allowing it to interact with the user U and in particular to recognize (i.e. to input or capture and record) items of information supplied by the user during his interaction with the voice server 14. In a variant, a simple module capable of emitting speech to the user U to request the providing of items of information and to collect the items of information supplied by the user can be envisioned as a replacement for the voice recognition module. In a variant or in addition to the voice recognition module, the interactive voice server 14 can comprise a conversational agent and/or a voice synthesis module, also known per se and not described in detail here;
  - an obtaining module 7E configured to obtain, via the voice channel set up by the setting-up module 7D between the terminal 2 and the voice server 14, an authentication code of the user U of the terminal 2. Note that the user U can provide this authentication code in different ways, for example vocally or by inputting the authentication code on the keyboard of his terminal, in which case the authentication code thus inputted is then transmitted by the terminal in the Voice over IP channel using vocal frequencies or DTMF (Dual Tone Multi Frequency). The module 7E following the chosen implementation can therefore comprise the aforementioned voice recognition module of the interactive voice server 14, and/or a module for receiving DTMF signals also contained here in the interactive voice server 14, and able to extract from the DTMF signal received from the terminal the authentication code conveyed by this signal;
  - a providing module 7F, here configured to interrogate the determining module 7B so that it determines whether or not the obtained authentication code is associated at Voice over IP network level 3, and more specifically in the database 4, with a public telephone identity allocated by the network to a user, and where applicable to provide to the terminal 2 this public telephone identity as well as authentication data that is associated with it at Voice over IP network level 3, and more specifically here in the database 13.

The functions of the modules 7A-7F are described in more detail below with reference to the steps of the processing method according to the invention.

In the embodiment described here, the terminal 2 has the hardware architecture of a computer, as shown in FIG. 3. It particularly comprises a processor 15, a read-only memory 16, a random-access memory 17, a non-volatile memory 18, communication means 19, and means 20 for interacting with the user of the terminal 2. These interaction means for example comprise a screen, a microphone, a loudspeaker etc.

The communication means 19 allow the terminal 2 to communicate with the gateway 6 of the local network 5, but also, by way of this gateway, with the items of equipment of the Voice over IP telephone network 3 and particularly with the device 7. They notably include here a network card or any other means of connectivity to the gateway 6 (wired or wireless) and a VoIP protocol stack suitable for implementing a Voice over IP communication technique according to the SIP protocol.

The read-only memory 16 of the terminal 2 constitutes a recording medium in accordance with the invention, readable by the processor and wherein is recorded a computer program PROG2 in accordance with the invention, including instructions for executing a communication method according to the invention. The program PROG2 defines various functional and software modules of the terminal 2, able to implement the steps of the communication method according to the invention, particularly by relying on the hardware elements 15-20 of the terminal 2 described previously. Here these modules particularly comprise:

- an issuing module 2A, able to issue a call initiation message over the Voice over IP network 3;
- a setting-up module 2B, here enabled on an instruction from the device 7 of the Voice over IP network 3, and configured to set up a Voice over IP channel with the voice server 14;
- a providing module 2C, configured to provide via the channel set up with the voice server 14 an authentication code of the user of the terminal 2, this authentication code being itself vocally supplied to the module 2C by the user of the terminal 2 via the input/output means 20 of the terminal 2;
- a receiving module 2D, able to receive from the device 7 of the Voice over IP network 3 a public telephone identity associated at Voice over IP network level 3 with the authentication code supplied by the providing module 2C to the voice server 14, as well as authentication data associated with this public telephone identity at Voice over IP network level (in the database 13 here);
- an authenticating module 2E, configured to interact with the device 7 for the purpose of authenticating the terminal 2 to the Voice over IP network 3 using the authentication data received by the receiving module 2D.

In the embodiment described here, it is supposed that the terminal 2 is initially configured, for example in the factory, with a standard predetermined telephone identity, denoted IDFIX. This telephone identity is set to any arbitrary value, for example 100. The issuing module 2A is also configured to use this standard telephone identity to send Voice over IP calls as long as it has not been paired with a public telephone identity allocated by the Voice over IP network 3 in accordance with the invention. In other words, when the user U uses his terminal 2 to make a Voice over IP call via the Voice over IP network 3 for the first time, the network issues via its issuing module 2A a SIP INVITE message comprising in the FROM field of its header the standard telephone identity IDFIX=100. Following the receipt of the public telephone identity allocated by the Voice over IP network 3 to the user U in accordance with the invention, the module 2A replaces the standard telephone identity IDFIX with the public telephone identity that it has received from the device 7: in other words, the issuing module 2A is henceforth configured to use this public telephone identity to make Voice over IP calls via the Voice over IP network 3, and in particular to insert this public telephone identity into the FROM fields of the headers of the SIP INVITE messages that it sends.

The functions of the modules 2A-2E will now be described in more detail with reference to the steps of the communication method according to the invention.

FIG. 4 shows the main steps of the processing and communication methods according to the invention, as respectively implemented, in a particular embodiment, by the device 7 of the Voice over IP network 3 and by a terminal 2 of the user U.

It is supposed here that the user U wishes to use this terminal 2 to make a Voice over IP call via the fixed telephone network 3 and that this terminal 2 has until now never been paired with the telephone identity IDPub3 allocated to the user U when he took out his subscription to the operator of the network 3.

To issue a call over the network 3, the terminal 2 issues, in a known manner and via its issuing module 2A, a SIP INVITE message M1 addressed to the network 3 containing, in its header (in the TO field), the public telephone identity of the recipient DEST1 that the user U seeks to connect with, denoted IDPubDEST1 here (step E10). As mentioned previously, it is supposed at this stage that the terminal 2 is configured with a standard telephone identity IDFIX, received for example during its configuration in the factory or during a (re)-initialization of the terminal 2, and that its issuing module 2A is configured to use this standard telephone identity IDFIX when it sends call initiation messages (particularly by inserting it into the FROM fields of the headers of the SIP INVITE messages that it issues). The first SIP INVITE message M1 issued by the terminal 2 therefore comprises in its TO field the public telephone identity IDPubDEST1 of the recipient DEST1 and in its FROM field the standard telephone identity IDFIX.

This SIP INVITE message M1 transits via the gateway 6 of the local network 5, then is received by the device 7 of the Voice over IP network 3 and more specifically by its receiving module 7A (step E20).

The determining module 7B of the device 7 then analyzes the contents of the SIP INVITE message M1 received from the terminal 2 and more specifically the contents of the FROM field of the message M1. It determines whether or not it contains a public telephone identity allocated by the Voice over IP network 3 to a user U (step E30).

In the embodiment described here, the FROM field of the message M1 contains the standard telephone identity IDFIX. On detecting this standard telephone identity, the determining module 7B recognizes that this standard telephone identity is a predetermined "dummy" identity and is not a public telephone identity allocated by the Voice over IP network 3.

In a variant, it may consult the database 4 of the Voice over IP network 3 to determine whether the contents of the FROM field (for example the standard telephone identity IDFIX here) is a public telephone identity allocated by the Voice over IP network 3.

The absence of public telephone identity allocated by the Voice over IP network 3 in the SIP INVITE message M1 triggers the activation of the modules 7D to 7F of the device 7 and of the voice server 14.

More precisely, the device 7, via its setting-up module 7D, triggers the setting-up of a Voice over IP channel between the terminal 2 and the interactive voice server 14 (step E40). For this purpose, in the embodiment described here and the SIP context envisioned, the module 7D issues to the interactive voice server 14 a SIP INVITE message to which it replies with a 200 OK message containing its items of media information for setting up a media stream (RTP for Real Time Protocol stream). The module 7D responds to the SIP INVITE message M1 issued by the terminal 2 by sending it a 200 OK acceptance message containing the items of media information of the voice server 14.

On receiving this reply message, a Voice over IP channel is set up between the terminal 2 and the voice server 14 (note that the signaling relating to this Voice over IP channel is not exchanged directly between the terminal 2 and the voice server 14 but goes through the device 7, the signaling and the media streams being managed separately in the SIP protocol) (step E50).

Once this channel has been set up, the interactive voice server 14 interacts with the user U of the terminal 2, and particularly prompts him to provide the authentication code that he has received from the network 3 on taking out his subscription to the operator of the network 3 (step E60).

In reply to this prompt, the user U provides via his terminal 2 and his providing module 2C the authentication code AUTH3 that the operator of the network 3 gave him when he took out his subscription (step E70). For this purpose, he can either pronounce the authentication code AUTH3 via the microphone of his terminal 2, or more discreetly, provide this authentication code via the keyboard of his terminal 2. In the latter hypothesis, the authentication code is then transmitted by the providing module 2C over the Voice over IP channel via a signal using vocal frequencies (DTMF) and is received by the receiving module of the interactive voice server 14.

The authentication code AUTH3 is obtained and recognized by the interactive voice server 14 by way of its voice recognition module or by way of its DTMF signal receiving module. The authentication code AUTH3 is supplied by the voice server 14 to the obtaining module 7E of the device 7. Note that the prompting of the user U to provide his authentication code, the obtaining of the code by the voice server 14, via the Voice over IP channel set up, and the providing of it to the module 7E constitute a step of obtaining the authentication code of the user U by the device 7 within the meaning of the invention.

Then the device 7, here by way of its determining module 7B, checks with the database 4 of the network 3 if the authentication code AUTH3 supplied by the user U corresponds to a telephone identity previously allocated by the network 3 to a user. For this purpose, the determining module 7B polls the database 4 of the network 3 by transmitting to it the authentication code AUTH3 received from the user U (step E80).

In the example envisioned here, the authentication code AUTH3 is associated in the database 4 with a telephone identity, namely the telephone identity IDPub3 allocated by the network 3 to the user U. The database 4 returns a positive answer to the device 7 including the telephone identity IDPub3 (step E90).

On receiving the positive answer from the database 4 and the public telephone identity IDPub3, the device 7 via its providing module 7F polls the database 13 of the Voice over IP network 3 to obtain authentication data associated in the database 13 with the public telephone identity IDPub3 (step E100).

The database 13 replies to the device 7 by providing it with the authentication data DATA3 associated by the Voice over IP network 3 with the public telephone identity IDPub3 (step E120).

In the embodiment described here, the device 7, after the authentication data DATA3 has been obtained, ends the call set up between the terminal 2 and the interactive voice server 14, and for this purpose sends a SIP BYE message to the interactive voice server 14.

Moreover, the device 7 provides, via its providing module 7F, to the terminal 2 the public telephone identity IDPub3 and the associated item of authentication data DATA3, received from the Voice over IP network 3 (step E130). In the embodiment described here, these items of information are supplied in a secure manner to the terminal 2, for example via a secure link set up between the terminal 2 and the device 7 in a manner known per se and not described here. In a variant, these items of information may be encrypted before being sent to the terminal 2.

These items of information are received by the receiving module 2D of the terminal 2 and stored in its non-volatile memory 18 for subsequent use on the Voice over IP network 3, and particularly to issue Voice over IP calls and to be authenticated to the Voice over IP network 3 as described in more detail hereinafter (step E140).

Then the device 7, by way of its triggering module 7C, triggers the setting-up of the call required by the terminal 2: this manifests, in the embodiment described here, by the transfer of the SIP INVITE call initiation message received in step E10 to the VoIP platform 8 of the network 3 so that it can effect in a manner known per se for the purpose of setting up the call with the recipient identified by the telephone identity IDPubDest1 (step E150).

Moreover, the triggering module 7C of the device 7 renegotiates with the setting-up module 2A of the terminal 2 a new Voice over IP channel to set up the call with the recipient identified by the telephone identity IDPubDest1 (étape E160). This is done in a manner known per se, not described in detail here, by issuing a SIP REINVITE message to the terminal 2. After this renegotiation, if the recipient DEST1 has replied favorably, the call is set up (not shown in FIG. 4).

It is supposed that the user U wishes to issue a new Voice over IP call via its terminal 2 to, for example, another recipient DEST2 with the telephone identity IDPubDEST2.

The terminal 2 sends a new call initiation message SIP INVITE M2 containing in the TO field of its header the telephone identity IDPubDEST2 via its issuing module 2A (step E170). In accordance with the invention, the terminal 2 further inserts into the FROM header of this SIP INVITE message the public telephone identity IDPub3 allocated by the Voice over IP network 3. It now proceeds in this way for each new Voice over IP call setting-up message made via the Voice over IP network 3.

The SIP INVITE message M2 issued by the terminal 2 transits via the gateway 6 and is received by the receiving module 7A of the device 7 in the Voice over IP network 3 (step E180).

As previously described in step E30, the determining module 7B of the device 7 determines whether or not the SIP INVITE message received from the terminal 2 contains a public telephone identity allocated to a user by the Voice over IP network 3 (step E190). For this purpose, the determining module 7B extracts the telephone identity IDPub3 contained in the FROM field of the SIP INVITE message M2 and checks with the database 4 that it is indeed a public telephone identity allocated by the Voice over IP network 3 to a user.

In the example envisioned here, the telephone identity IDPub3 is contained in the database 4 and is indeed a public telephone identity allocated by the Voice over IP network 3 to a user. The database 4 therefore replies positively to the determining module 7B of the device (step E200).

Here this positive reply triggers the sending of a procedure of authentication of the terminal 2 by the device 7 (step E210). This authentication can be carried out in a similar way to that described in the document RFC 2617, June 1999 in the context of the HTTP protocol (HyperText Transfer Protocol) by requesting from the terminal 2 a proof of knowledge of the authentication data DATA3 associated with the telephone identity IDPub3.

It is here supposed that the terminal 2 is positively authenticated to the device 7 using the authentication data DATA3.

Following the positive authentication of the terminal 2, the triggering module 7C of the device 7 triggers the setting-up of the call to the recipient DEST2 identified by the telephone identity IDPubDest2 (step E220). Here this consists, on the one hand, in transferring the SIP INVITE message received from the terminal 2 to the VoIP platform 8 and, on the other hand, to set up a Voice over IP channel with the setting-up module 2A of the terminal 2 to support the call, in a manner known per se and not described in detail here.

The example envisioned here considers the pairing of a terminal 2 of a user, when the terminal is directly connected to the gateway 6. This can be the case for example in a domestic or residential environment 6. The invention can however be applied to other contexts: typically, the user can be a legal entity, such as a company, and the terminal paired with the public identity can be a platform of IPBX type in charge of connecting a plurality of company users (e.g. employees) to a Voice over IP network via an access gateway 6 to the Voice over IP network. In this case, it is a certificate uniquely allocated to the platform IPBX which is paired in the Voice over IP network with the public identity (i.e. the terminal within the meaning of the invention is an IPBX platform). Many other contexts can also be envisioned.

Note that the invention offers the possibility of easily pairing several terminals with one and the same public telephone identity allocated by the Voice over IP network, each terminal proceeding in the same way as has just been described for the terminal 2.

Although the present disclosure has been described with reference to one or more examples, workers skilled in the art will recognize that changes may be made in form and detail without departing from the scope of the disclosure and/or the appended claims.

The invention claimed is:

1. A method for processing messages by a device of a Voice over IP (Internet Protocol) network of an operator, comprising, following receipt of a message initiating a Voice over IP call coming from a terminal:
   determining whether or not the received message contains in a source field a public telephone identity allocated to a user by the operator of the Voice over IP network;
   a) if the device of the Voice over IP network determines that the message contains in a source field a public telephone identity allocated to a user by the operator of the Voice over IP network:
      a.i) triggering a setting-up of the Voice over IP call with a recipient of the received message following a positive authentication of the terminal;
   b) else, if the device of the Voice over IP network determines that the message does not contain in a source field a public telephone identity allocated to a user by the operator of the Voice over IP network:
      b.i) setting up a Voice over IP channel between the terminal and a voice server hosted by the device of the Voice over IP network;
      b.ii) obtaining, by the voice server via this Voice over IP channel, an authentication code of a user of the terminal; and
      b.iii) in response to the obtained authentication code being associated at Voice over IP network level with a public telephone identity allocated by the operator of the Voice over IP network to the user of the terminal, providing to the terminal said public telephone identity allocated to the user by the operator of the Voice over IP network and authentication data associated at Voice over IP network level with this public telephone identity for making Voice over IP calls and being authenticated to the Voice over IP network.

2. The processing method as claimed in claim 1 wherein the authentication of the terminal prior to the triggering comprises requesting the providing to the terminal of a proof of knowledge of authentication data associated at Voice over IP network level with the public telephone identity contained in the source field of the received message.

3. The processing method as claimed in claim 1 wherein, during the determining, the device determines that the received initiation message does not contain in a source field any public telephone identity allocated to a user by the operator of the Voice over IP network if it detects the presence in the source field of the received initiation message of a predetermined telephone identity communicated to the terminal during a prior phase of configuration of the terminal.

4. The processing method as claimed in claim 1 further comprising, if the obtained authentication code is associated at Voice over IP network level with a public telephone identity allocated by the operator of the network to the user of the terminal, triggering the setting-up of a Voice over IP call with a recipient of the initiation message received from the terminal by transferring the received initiation message.

5. The processing method as claimed in claim 4 wherein the triggering the setting-up of a Voice over IP call comprises renegotiation with the terminal of a voice channel to set up the call.

6. The processing method as claimed in claim 1, wherein the call initiating message is a message in accordance with the SIP protocol (Session Initiation Protocol).

7. The processing method as claimed in claim 1 wherein during the providing step, the public telephone identity and the authentication data are supplied to the terminal in a secure manner.

8. A method of communication by a terminal comprising:
   issuing a message initiating a Voice over IP (Internet Protocol) call comprising in a source field a predetermined telephone identity with which the terminal has been previously configured;
   setting up a Voice over IP channel with a voice server hosted by a Voice over IP network device;
   providing via this Voice over IP channel to the voice server an authentication code of a user of the terminal;

receiving, from the device of the Voice over IP network, a public telephone identity associated at Voice over IP network level with said supplied authentication code and authentication data associated at Voice over IP network level with this public telephone identity; and issuing at least one new message initiating a Voice over IP call comprising in a source field said public telephone identity and a step of authenticating to the Voice over IP network using the authentication data.

9. A non-transitory computer-readable recording medium on which is recorded a computer program including instructions suitable for implementing a method for processing messages by a device of a Voice over IP (Internet Protocol) network of an operator when the instructions are executed by a processor of the device, wherein the instructions configure the device to, following receipt of a message initiating a Voice over IP call coming from a terminal:

determine whether or not the received message contains in a source field a public telephone identity allocated to a user by the operator of the Voice over IP network;

a) if the device of the Voice over IP network determines that the message contains in a source field a public telephone identity allocated to a user by the operator of the Voice over IP network:

a.i) trigger a setting-up of the Voice over IP call with a recipient of the received message following a positive authentication of the terminal;

b) else, if the device of the Voice over IP network determines that the message does not contain in a source field a public telephone identity allocated to a user by the operator of the Voice over IP network:

b.i) set up a Voice over IP channel between the terminal and a voice server hosted by the device of the Voice over IP network;

b.ii) obtain, by the voice server via this Voice over IP channel, an authentication code of a user of the terminal; and b.iii) in response to the obtained authentication code being associated at Voice over IP network level with a public telephone identity allocated by the operator of the Voice over IP network to the user of the terminal, provide to the terminal said public telephone identity allocated to the user by the operator of the Voice over IP network and authentication data associated at Voice over IP network level with this public telephone identity for making Voice over IP calls and being authenticated to the Voice over IP network.

10. A device of a Voice over IP (Internet Protocol) network of an operator hosting a voice server and comprising:

a processor; and a non-transitory computer-readable recording medium on which is recorded instructions which when executed by the processor configure the device to process messages of the Voice over IP network, wherein the instructions configure the device to, following receipt of a message initiating a Voice over IP call coming from a terminal:

determine whether or not the received message contains in a source field a public telephone identity allocated to a user by the operator of the Voice over IP network;

a) if the device of the Voice over IP network determines that the message contains in a source field a public telephone identity allocated to a user by the operator of the Voice over IP network:

a.i) trigger a setting-up of the Voice over IP call with a recipient of the received message following a positive authentication of the terminal;

b) else, if the device of the Voice over IP network determines that the message does not contain in a source field a public telephone identity allocated to a user by the operator of the Voice over IP network:

b.i) set up a Voice over IP channel between the terminal and the voice server hosted by the device of the Voice over IP network;

b.ii) obtain, by the voice server via this Voice over channel, an authentication code of a user of the terminal; and b.iii) in response to the obtained authentication code being associated at Voice over IP network level with a public telephone identity allocated by the operator of the Voice over IP network to the user of the terminal, provide to the terminal said public telephone identity allocated to the user by the operator of the Voice over IP network and authentication data associated at Voice over IP network level with this public telephone identity for making Voice over IP calls and being authenticated to the Voice over IP network.

11. The device as claimed in claim 10 wherein the voice server comprises a voice recognition module, and/or a voice synthesis module, and/or a conversational agent.

12. A Voice over IP (Internet Protocol) terminal comprising:

a processor; and a non-transitory computer-readable recording medium on which is recorded instructions which when executed by the processor configure the terminal to:

issue a message initiating a Voice over IP call comprising in a source field a predetermined telephone identity with which the terminal has been previously configured;

set up a Voice over IP channel with a voice server hosted by a Voice over IP network device;

provide via this Voice over IP channel to the voice server an authentication code of a user of the terminal;

receive, from the device of the Voice over IP network, a public telephone identity associated at Voice over IP network level with said supplied authentication code and authentication data associated at Voice over IP network level with this public telephone identity; and issue at least one new message initiating a Voice over IP call comprising in a source field said public telephone identity and a step of authenticating to the Voice over IP network using the authentication data.

* * * * *